United States Patent
Kazumi

Patent Number: 5,381,207
Date of Patent: Jan. 10, 1995

[54] OPTICAL APPARATUS RESPONSIVE TO AN EXTERNAL INFORMATION OUTPUT DEVICE

[75] Inventor: Jirou Kazumi, Yokohama, Japan

[73] Assignee: Canon Kabushiki Kaisha, Tokyo, Japan

[21] Appl. No.: 151,054

[22] Filed: Nov. 12, 1993

Related U.S. Application Data

[63] Continuation of Ser. No. 47,013, Apr. 14, 1993, abandoned, which is a continuation of Ser. No. 633,220, Dec. 24, 1990, abandoned.

[30] Foreign Application Priority Data

Dec. 28, 1989 [JP] Japan ................ 3-344810

[51] Int. Cl.⁶ .................................. G03B 7/00
[52] U.S. Cl. ........................... 354/412; 354/442
[58] Field of Search ............ 354/76, 412, 266, 484, 354/442, 443

[56] References Cited

U.S. PATENT DOCUMENTS

| | | | |
|---|---|---|---|
| 4,816,855 | 3/1989 | Kitaura et al. | 354/444 |
| 4,853,733 | 8/1989 | Watanabe et al. | 354/412 |
| 4,983,996 | 1/1991 | Kinoshita | 354/76 |
| 4,998,125 | 3/1991 | Watanabe et al. | 354/266 |
| 4,999,661 | 3/1991 | Veno et al. | 354/412 |
| 5,097,283 | 3/1992 | Kazumi . | |

FOREIGN PATENT DOCUMENTS

| | | |
|---|---|---|
| 0400528 | 12/1990 | European Pat. Off. . |
| 56-097327 | 8/1981 | Japan . |
| 01-132769 | 12/1990 | Japan . |

Primary Examiner—Russell E. Adams
Attorney, Agent, or Firm—Fitzpatrick, Cella, Harper & Scinto

[57] ABSTRACT

A camera controls its operation according to the data contents of a signal transmitted from an external information output device. The camera includes a detector for detecting the signal transmitted from the information output device, a switch for switching the detector to a detectable state, and a limitation unit for making the detector non-operable irrespective of any state of the switch. Thus, a meaningless detection operation of the detector is limited.

35 Claims, 7 Drawing Sheets

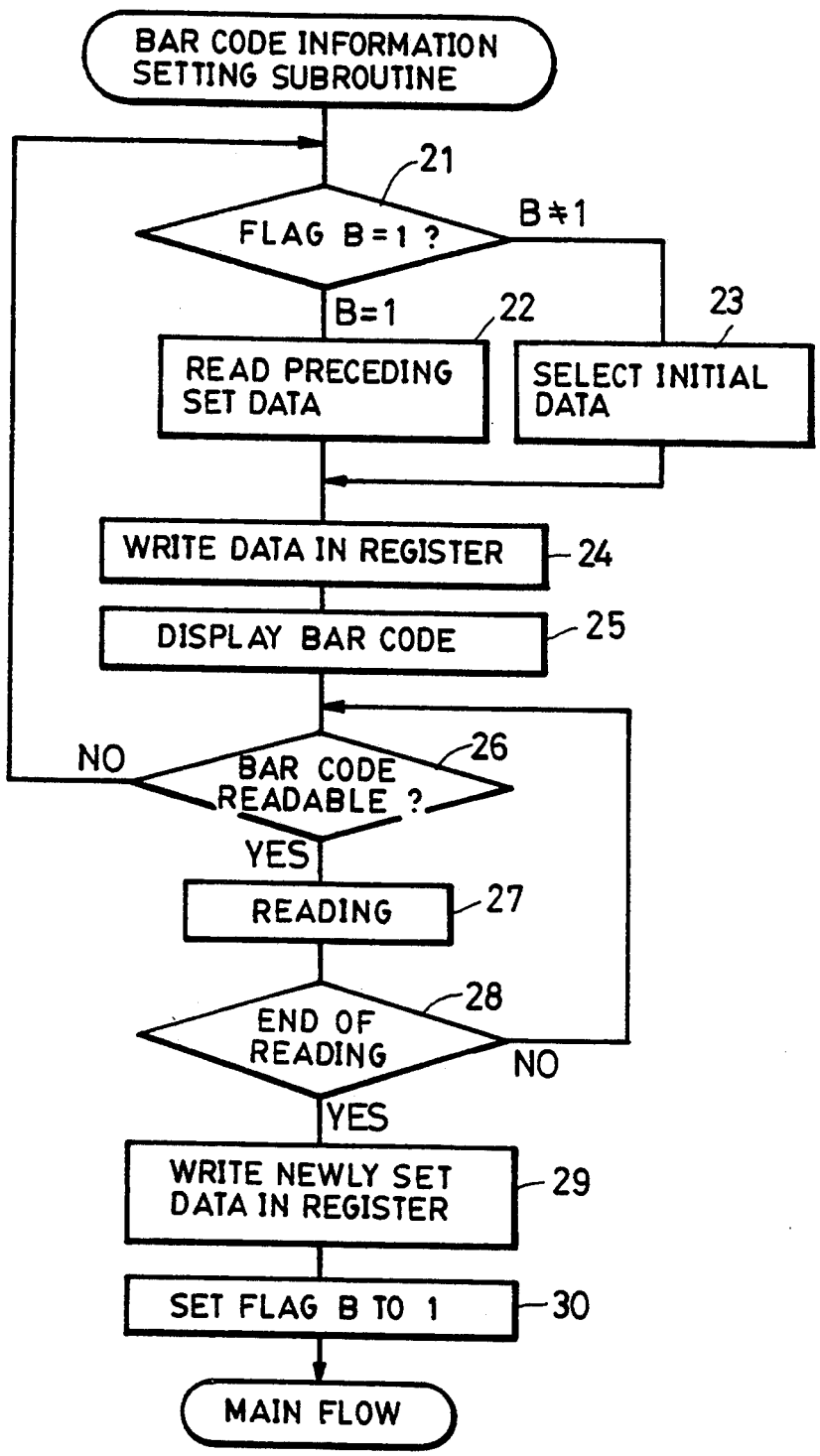

5,381,207

1

OPTICAL APPARATUS RESPONSIVE TO AN EXTERNAL INFORMATION OUTPUT DEVICE

This application is a continuation of application Ser. No. 08/047,013 filed Apr. 14, 1993, which is a continuation of application Ser. No. 07/633,220 filed Dec. 24, 1990, both now abandoned.

BACKGROUND OF THE INVENTION

1. Field of the Invention

The present invention relates to a camera for receiving data signals from an external information reading and transmitting device.

2. Description of the Related Art

Commonly assigned Japanese Patent Application No. 01-132769, filed May 29, 1989, and U.S. patent application Ser. No. 530,190, filed May 29, 1990, disclose a camera system in which information necessary for photographing, for example information written on a photographic sample storage medium using a bar code or the like, is read by an information reading device. The read data are transmitted to a camera using infrared light. The data are received by an infrared photosensor built in the camera, and photographic program operations are automatically switched according to the received data. Thus, even a person who does not know the effect of changing the diaphragm, shutter speed, and the like on a photograph can perform an optimum photographing operation.

Since the data are received in the form of infrared light, it is necessary to convert and amplify the detected signal to a signal of a type and level capable of being detected by a control unit of the camera. In conventional cameras, it is necessary to always supply current to the amplification circuit (since it is uncertain when the data will be transmitted), which consumes a considerable amount of current. Such cons;rant current consumption is not desirable in a camera, or the like, which uses a battery for its power supply. Accordingly, a conventional camera must have a configuration wherein data are transmitted only after the camera has been placed in a state in which the data can be received according to a certain operation, and current is not supplied to the amplification circuit in any other state.

SUMMARY OF THE INVENTION

According to one aspect, the present invention provides a camera which prevents meaningless detection of external data signals by providing means for making a detection means non-operable irrespective of any state of a switching means for switching the detection means to a state wherein a signal transmitted from an external information reading device can be detected, separate from the switching means.

The present invention in one aspect relates to a camera comprising a detection means for detecting a signal transmitted from an external information output device, switching means for switching the detection means to a detectable state, limitation means for making the detection means non-operable irrespective of any state of the switching means, and control means for controlling the operation of the camera according to information detected by the detection means.

The present invention in another aspect relates to an optical apparatus comprising detection means for detecting a signal transmitted from an external information output device, switching means for switching the detection means to a detectable state, limitation means for making the detection means non-operable irrespective of any state of the switching means, and control means for controlling an exposure operation according to information detected by the detection means.

BRIEF DESCRIPTION OF THE DRAWINGS

FIG. 7 is a flowchart of a bar code information setting subroutine referred to in FIG. 6.

DETAILED DESCRIPTION OF THE PREFERRED EMBODIMENT

Figure 1:
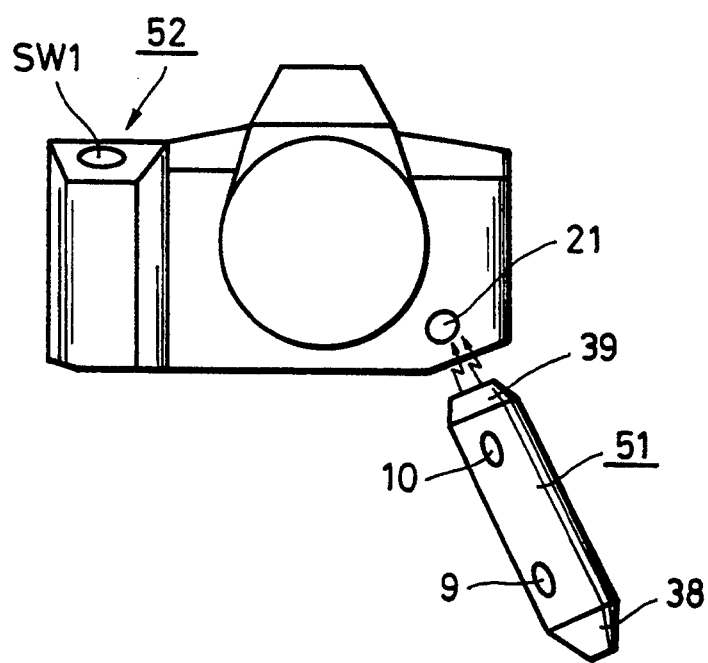
FIGS. 1(A) and 1(B) illustrate a main body of a camera and a code reading device according to an embodiment of the present invention.
Figure 1:
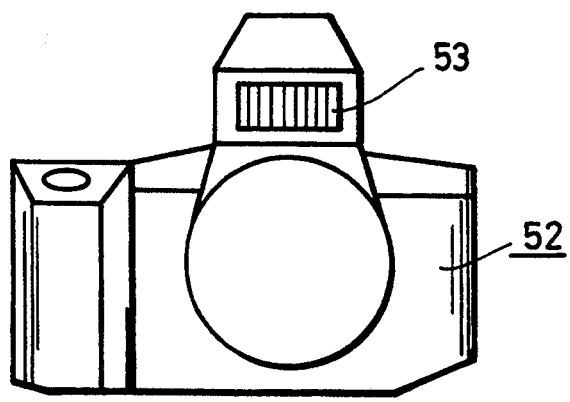

FIGS. 1(A) and 1(B) illustrate a main body 52 of a camera and a code reading/output device 51 according to a preferred embodiment of the present invention. FIG. 1(A) shows a state where in bar code information read by the code reading/output device 51 is transmitted to a photosensing unit 21 provided on the main body 52 of the camera as an optical signal. FIG. 1(B) shows a state wherein a flash 53 built in the main body 52 of the camera is automatically popped up for a flash operation. In FIG. 1(A), there are also shown a shutter release button SW1, switches 9 and 10, a code reading unit 38 and an optical signal transmitter 39.

Figure 2:
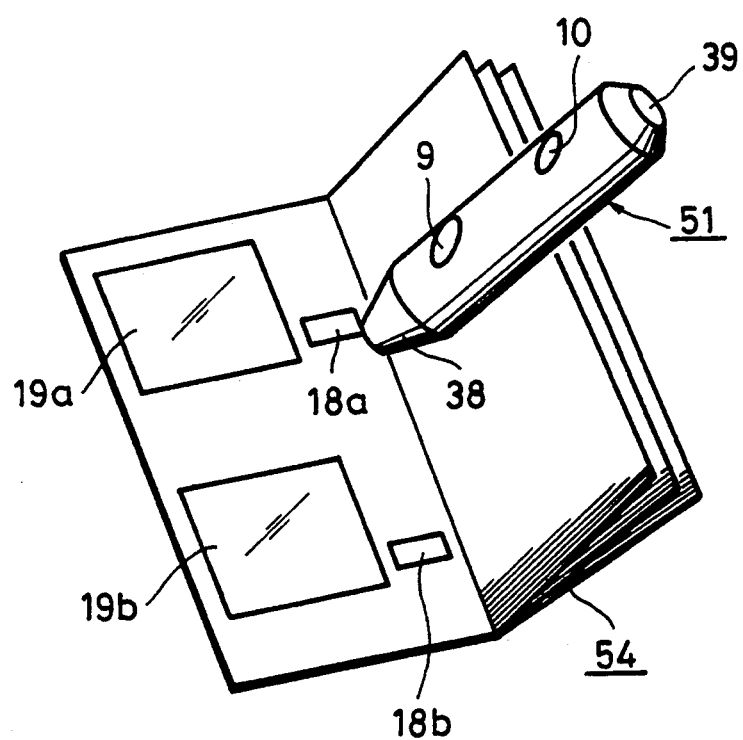
FIG. 2 illustrates a bar code list which is read by a code reading device.

FIG. 2 shows a bar code list 54 used in the present embodiment which is read by the code reading/output device 51 shown in FIG. 1(A). Photographs 19a and 19b, serve as photographic operation samples, and corresponding bar code members 18a and 18b are printed on the bar code list 54. FIG. 2 illustrates a bar code member 18a which is scanned and read by the code reading unit 38 of the code reading/output device 51.

Figure 3:
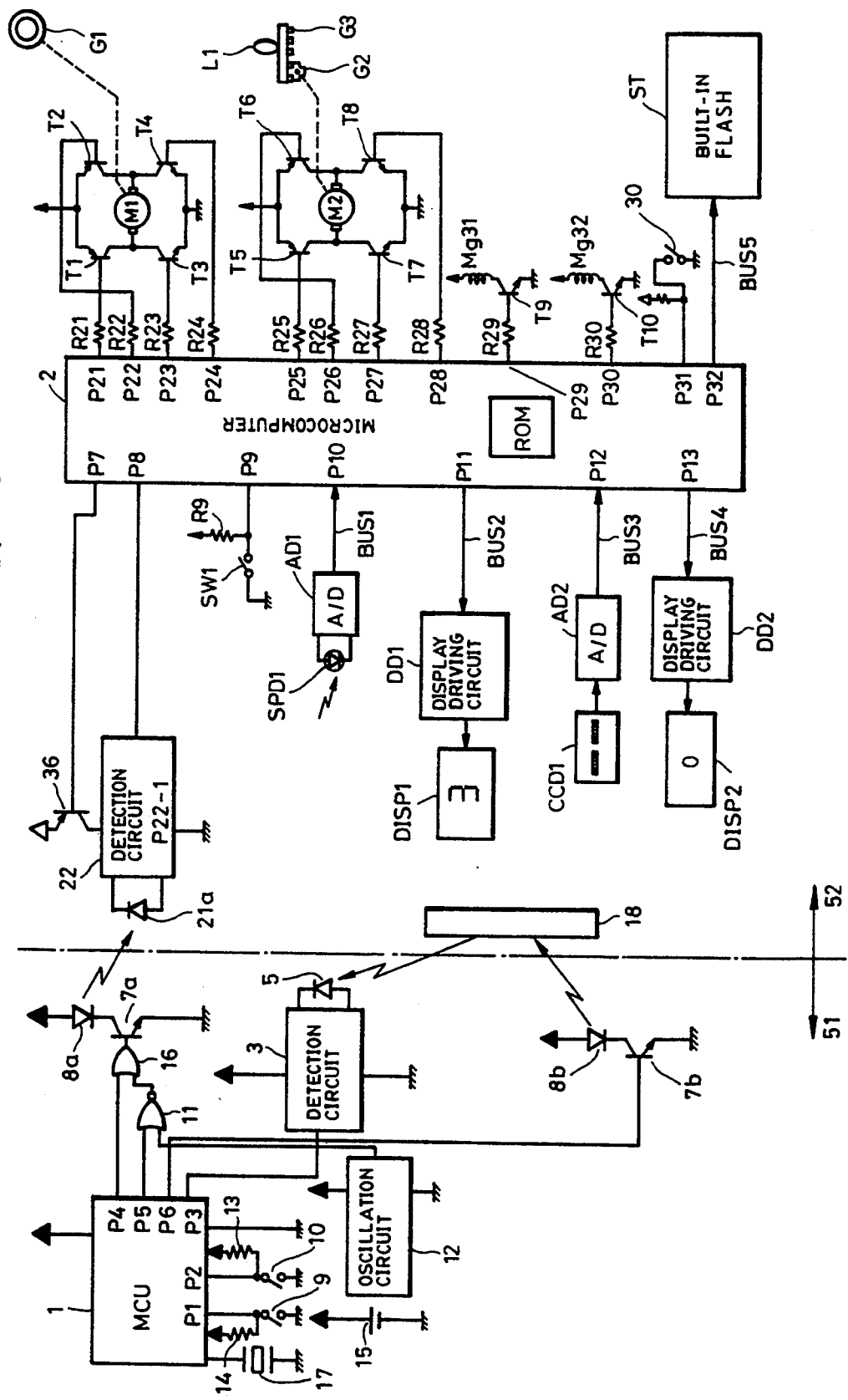
FIG. 3 is a circuit diagram of a preferred embodiment.

FIG. 3 shows the circuitry of a preferred embodiment of the invention including the code reading/output device 51 and the main body 52 of the camera.

In the code reading/output device 51, a one-chip microcomputer 1 for controlling a code reading operation comprises a CPU (central processing unit), a ROM (read-only memory), a RAM (random access memory), IOs (input/output ports), an SCI (serial communication interface) and a timer. Among the IOs of the microcomputer 1, input port P3 is connected to the output of a detection circuit (to be described later) for performing code detection. Other input ports P1 and P2 are connected to switches 9 and 10, and are pulled up to a power supply with resistors 3 and 14. Output port P4 among the IOs of the microcomputer 1 is connected to one of two input ports of an OR circuit 16. Output port P5 of the SCI of the microcomputer 1 is connected to one of two input ports of a NOR circuit 11. The other input port of the NOR circuit 11 is connected to an oscillation circuit 12 having a frequency of 38 KHz. The output from the NOR circuit 11 is input to the other input port of the OR circuit 16. The output from the NOR circuit 16 is connected to the base of transistor 7a (to be described later). Accordingly, the output from the output port P5 of the SCI is output as a signal modulated with a frequency of 38 KHz. Output port P6 is connected to the base of transistor 7b to control the operation thereof which in turn controls the output of an IRED (infrared emitting diode) 8b. The collectors of the transistors 7a and 7b are connected to IREDs 8a and 8b, respectively.

An SPD 5 detects light reflected from a code member 18 is composed of black bars and white spaces, which is illuminated by light emitted from the IRED 8b, and can be optically read. A detection circuit 3, which incorporates an amplification unit for amplifying the level of a signal, detects an output from the SPD 5. The detection circuit 3 outputs a low level signal for space portions of the bar code member 18, and outputs a high level signal for bar portions. The collectors of the transistors 7a and 7b are connected to IREDs 8a and 8b, respectively. A power supply battery 15 supplies the microcomputer 1, the detection circuit 3, the oscillation circuit 12, and the IREDs 8a and 8b with power. A sounder 17 indicates when a code reading operation has been properly performed.

In the main body 52 of the camera, a microcomputer 2 for controlling the camera comprises a CPU, a ROM, a RAM, IOs and an SCI as the microcomputer 1. An SPD 21a is incorporated in a photosensing unit 21 so as to sense infrared light emitted from the IRED 8a and is connected to a detection circuit 22. The detection circuit 22 is configured so as to output a low-level signal from its output port 22-1 only when a signal modulated with a frequency of 38 KHz is present. Power for the detection circuit 22 is switched by transistor 36, whose base is connected to output port P7 of the microcomputer 2. The output port 22-1 is connected to input port P8 of the microcomputer 2.

A low-level signal is provided to input port P9 of the microcomputer 2 when the shutter release button SW1 of the camera shown in FIG. 1 is depressed. A silicon photodiode SPD1 performs photometry. An A/D converter AD1 converts a signal from the silicon photodiode SPD1 into a digital value representing brightness information, and transmits the converted signal to the microcomputer 2 via bus line BUS1. Input port P10 inputs the A/D converted value.

A display driving circuit DD1 drives a display unit DISP1. Output port P11 provides a signal to the display driving circuit DD1 via bus line BUS2. A line sensor CCD1 measures a focusing distance. An A/D converter AD2 converts an analog signal received from the line sensor CCD1 into a digital value, and provides the converted signal to input port P12 of the microcomputer 2 via bus line BUS3. A display unit DISP2, which is displayed within the finder of the camera or the like, displays a focusing state. A display driving circuit DD2 drives the display unit DISP2. Output port P13 provides a signal to the display driving circuit DD2 via bus line BUS4.

A motor M1 is provided to transport a film. To one end of the motor M1 are contracted the collector of PNP transistor T1 and the collector of NPN transistor T3. To the other end of the motor M1 are connected the collector of PNP transistor T2 and the collector of NPN transistor T4. The emitters of the PNP transistors T1 and T2 are connected to the plus side of power supply voltage, and the emitters of the NPN transistors T3 and T4 are connected to the minus side of the power supply voltage. The bases of the PNP transistors T1 and T2 are connected to output ports P21 and P22 of the microcomputer 2 via base resistors R21 and R22, respectively. The bases of the NPN transistors T3 and T4 are connected to output ports P23 and P24 of the microcomputer 2 via base resistors R23 and R24, respectively.

As can be understood from the circuit configuration, when the transistors T1 and T4 are switched on, current passes through the motor M1 from the left to the right in FIG. 3, and the motor M1 rotates in the clockwise direction to perform film winding and shutter charging operations. When the transistors T2 and T3 are switched on, current passes through the motor M1 from the right to the left in FIG. 3, and the motor M1 rotates in the counterclockwise direction to perform a film rewinding operation. For this purpose, the motor M1 cooperates with a spool G1 and a rewinding gear (not shown) to transport the film.

A motor M2 moves a photographing optical system L1 back and forth. To one end of the motor M2 are connected the collector of PNP transistor T5 and the collector of NPN transistor T7, and to the other end are connected the collector of PNP transistor T6 and the collector of NPN transistor T8. The emitters of the PNP transistors T5 and T6 are connected to the plus side of the power supply voltage, and the emitters of the NPN transistors T7 and T8 are connected to the minus side of the power supply voltage. The bases of the PNP transistors T5 and T6 are connected to output ports P25 and P26 of the microcomputer MC1 via base resistors R25 and R26, respectively. The bases of the NPN transistors T7 and T8 are connected to output ports P27 and P28 of the microcomputer 2 via base resistors R27 and R28, respectively. When the transistors T5 and T8 are switched on, current passes through the motor M2 from the left to the right in FIG. 3, and the motor M2 rotates in the clockwise direction to advance the photographing optical system L1 via a pinion gear G2 and a rack G3. When the transistors T5 and T6 are switched on, current passes through the motor M2 from the right to the left in FIG. 3, and the motor M2 rotates in the counterclockwise direction to retract the photographing optical system L1 via the pinion gear G2 and the rack G3.

NPN transistor T9 is a switching transistor. The emitter of the transistor T9 is grounded, and the collector is connected to the plus side of the power supply voltage via a magnet coil Mg31. The base is connected to output port P29 of the microcomputer 2 via a resistor R29. When the transistor T9 is switched on, current passes through the magnet coil Mg31, and a first screen (not shown) of a shutter runs to start exposure of a film. NPN transistor T10 is also a switching transistor. The emitter of the transistor T10 is grounded, and the collector is connected to the plus side of the power supply voltage via a magnet coil Mg32. The base is connected to output port P30 of the microcomputer 2 via a resistor R30. When the transistor T10 is switched on, current passes through the magnet coil Mg32, and a second screen (not shown) of the shutter runs to terminate the exposure.

The built-in flash ST is supported at an apex position of a pentaprism so as to be movable between a retracted state shown in FIG. 1(A) and an elevated state shown in FIG. 1(B). Bus line BUS5 connects the flash ST to output port P32.

A switch 30 is switched on when bar code information has been received from the code reading/output device 51, and is configured, for example, so that it is switched on when the optical signal transmitter 39 of the code reading device 51 is pressed on the photosensing unit 21 of the camera 52 (see FIG. 1(A)).

Next, the format of the bar code member 18 will be described.

Figure 4:
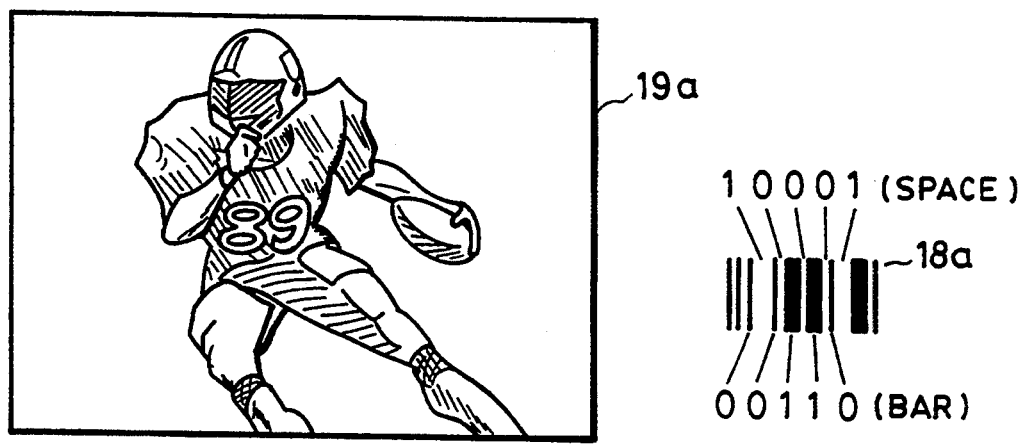
FIGS. 4(A) and 4(B) illustrate enlarged views of bar code lists.
Figure 4:
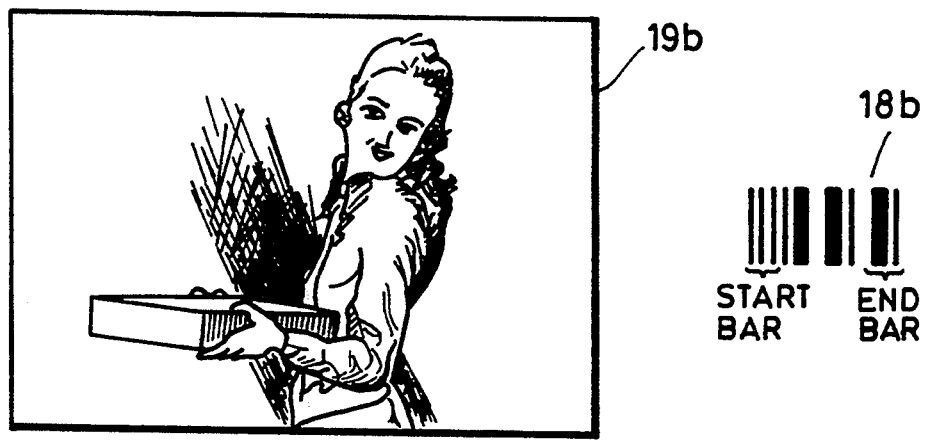

A bar code on the bar code member 18 comprises narrow lines (termed "narrow bars"), wide lines (termed "wide bars"), narrow spaces between bars (termed "narrow spaces") and wide spaces between bars (termed "wide spaces"). Narrow bars and narrow spaces correspond to "0", and wide bars and wide spaces correspond to "1". The ratio of the width of a narrow space to the width of a narrow bar is 1:1, and the ratio of the width of a narrow bar to the width of a wide bar is 1:3. FIGS. 4(A) and 4(B) show examples of the bar code member 18 (18a and 18b).

As shown in FIGS. 4(A) and 4(B), a bar code always starts with a combination of two narrow bars and narrow spaces (termed "start bars"), and ends with a narrow space sandwiched between a wide bar and a narrow bar (termed "end bars"). Data are written between the start bars and end bars. The data are written in a unit of five bars and corresponding five spaces, each representing a one-digit figure.

For example, in the bar code member 18a shown in FIG. 4(A), data "00110" are displayed by bars composed of narrow bars "0" and wide bars "1" after start bars. Similarly, data "10001" are displayed by the spaces between the bars. Accordingly, it can be understood that the bar code member 18a shown in FIG. 4(A) comprises a (decimal) bar code indicating, for example, "03". Similarly, the bar code member 18b shown in FIG. 4(B) comprises a bar code indicating, for example, "04".

Figure 5:
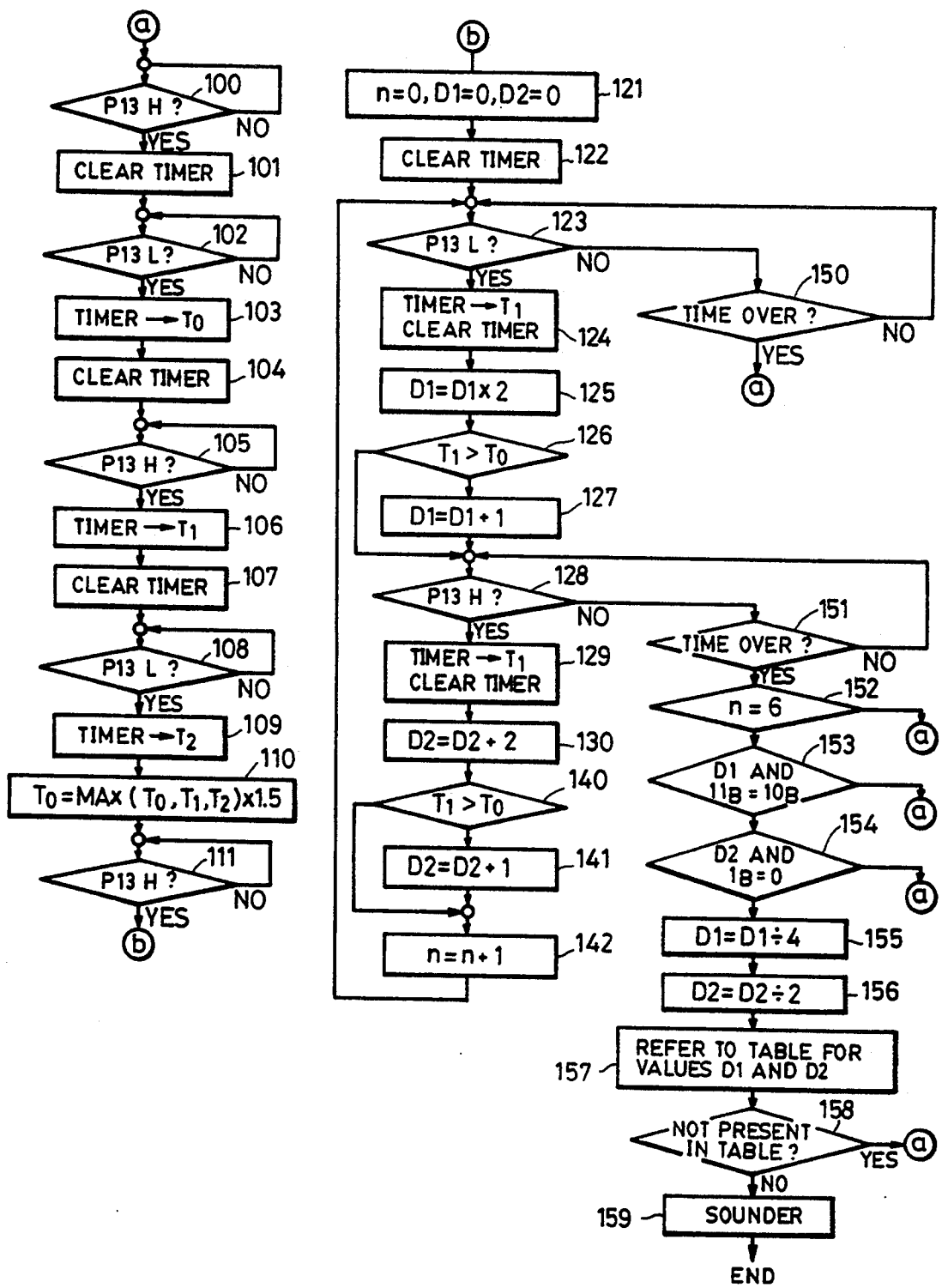
FIG. 5 is a flowchart showing the operation of reading a bar code according to a preferred embodiment of the present invention.

Next, the reading operation of a bar code will be explained in accordance with the flowchart shown in FIG. 5.

As described above, when an output from the detection circuit 3, that is, an input to the input port P3 is at a high level, the bar code member 18 is in the state of a bar, and when an output from the detection circuit 3 is at a low level, the bar code member 18 is in the state of a space.

Six registers T0, T1, T2, n, D1 and D2 are provided in the RAM within the microcomputer 1.

First, it is awaited until a first bar is found at step 100. A time period for the first narrow bar is measured at steps 101 through 103. A time period for a narrow space is measured from step 104 to step 106, and a time period for the next narrow bar is measured from step 107 to step 109. A value obtained by multiplying the largest value among the measured time periods by 1.5 is used as time period T0 which is to be used for narrow-or-wide determination.

When the measurement of the time period T0 for the start bar has ended, a register for data is cleared at step 121, and reading of data is started.

Time periods for bars are measured at steps 123 and 124. If a time period is larger than the time T0, the corresponding bar is determined to be "1". The data are doubled, and "1" is added thereto. In the other cases, only the data are doubled. Time periods for spaces are measured at steps 128 and 129. Similarly, if a time period is larger than the time T0, the corresponding space is determined to be "1", and the same operation is performed.

Every time a combination of a bar and a space has been read, the contents in the register n are incremented, and reading of a bar and a space is repeated.

Overflow of a timer is detected at steps 150 and 151. If overflow is present, it is determined that reading of a bar code has ended. When overflow is present at step 150, it is determined that the result is an error, and the process starts again from point ⓐ, that is, from step 100.

When overflow is present at step 151, whether or not reading has normally ended is checked according to the number of bars at step 152, and subsequently end bars are checked at steps 153 axed 154. If reading has not normally ended, it is determined that the result is an error, and the operation from point ⓐ is performed again. If it has been determined that reading has normally ended, the result of the determination is indicated by the sounder 17, Reading of the bar code member 18a corresponding to the photograph 19a will now be explained. With reference to FIGS. 2 and 3, the bar code is read by scanning the bar code member 18a with the reader 38 while depressing the switch 9. When the switch 9 has been depressed, the microcomputer 1 makes the output port P6 a high level to switch on the transistor 7b, and the IRED 8b is thereby lit.

At the same time, the microcomputer 1 performs a reading operation of the bar code. Since the bar code member 18a represents "03" (decimal), the value is read, and is temporarily stored in the internal RAM. When the switch 9 has been switched off, the microcomputer 1 sets the output port P6 at a low level.

Next, an explanation will be provided of the case wherein the data stored in the internal RAM are transmitted to the main body 52 of the camera.

The optical signal transmitter 39 is pressed on the photosensing unit 21 of the main body 52 of the camera. The switch 30 shown in FIG. 3 is thereby switched on.

When the switch 30 has been switched on to make the input port P31 a low level, the microcomputer 2 outputs a low-level signal to the output port P7 to switch on transistor 36. Power from the power supply is thereby supplied to the detection circuit 22 to provide a state wherein a signal can be received.

When the switch 10 in the code reading/output device 51 has subsequently been depressed, the microcomputer 1 outputs binary data "00000011" as a result of converting data "03" into a BCD code from the SCI (the output port P5).

This output is modulated with the frequency of 38 KHz by the NOR circuit 11 to switch on the transistor 7a, and the IRED 8a is thereby lit. Data (infrared light) emitted from the IRED 8a are detected by the SPD 21a disposed on the main body 52 of the camera. The detected data are demodulated by the detection circuit 22, and the resultant data are input to the SCI or the microcomputer 2. Accordingly, the microcomputer 2 receives data "00000011", that is, hexadecimal data "03".

The microcomputer 2 stores the data "03" in a part of the built-in RAM.

Next, the operation of the microcomputer 2 in the camera will be explained according to the flowcharts shown in FIGS. 6 and 7.

Step 1

It is checked whether the main body 52 of the camera is operated in a mode capable of inputting bar code information, that is, in a bar code mode. Although various kinds of switching operations to the bar code mode can be considered, switching, for example, by a rotary switch or the like is desirable, since the photographer can always visually watch the switching state of the mode.

When the bar code mode is provided at step 1, the process proceeds to step 2.

Step 2

The bar code information setting subroutine shown in FIG. 7 is executed.

Step 21

The contents of flag B representing whether or not bar code information has previously been input are checked. When the flag B is not "1" (B≠1), this state indicates that the camera has never performed an exposure control setting operation according to bar code information. When the flag B is "1" (B=1), this state indicates that the camera has already performed at least one exposure control setting operation according to bar code information.

When the flag B is "1", the process proceeds to step 22, and when the flag B is not "1", the process proceeds to step 23.

Step 22

Set data including the exposure control data according to the preceding bar code information are read from an EEPROM (electrically erasable and programmable read-only memory).

Step 22

Set data including initial exposure control data are read from the EEPROM.

Step 23

The initial set data comprise a normal program shown in step 11 (to be described later).

Step 24

The set data are written in a register of the microcomputer 2.

Step 25

Display of set data which can currently be executed is performed on the display unit DISP1 (see FIG. 3). The display is performed, for example, using numerals, alphabet characters and the like.

Step 26

It is determined whether bar code information can be read by the photosensing unit 21. That is, the code reading/output device 51 is pressed on the photosensing unit 21 to check whether the switch 30 is switched on. When the switch 30 is switched on, the process proceeds to step 27. If the switch 30 is switched off, it is awaited until the switch 30 is switched on. At this step 26, the determination whether the process can proceed to the next step 27 is performed not only by watching the state of the switch 30, but also according to the following conditions.

That is, first, during a shutter release operation, the process cannot proceed to step 27 even if the switch 30 is switched on. This indicates that in an actual photographing operation using a single-lens reflex camera, during the movement of a main mirror and a submirror to a retreat position for photographing, diaphragm operation, shutter operation, and release operation causing the return movement of the main mirror and the submirror to an initial position, a new bar code information reading operation is prohibited in order to prevent an erroneous operation.

Second, during a film feeding operation, the process cannot proceed to step 27 even if the switch 30 is switched on. This indicates that when the motor M1 operates, that is, during film winding and rewinding operations, a meaningless new bar code information reading operation is prohibited.

A reading operation is prohibited also during a mode switching operation, and when the mode is switched from the bar code mode to another mode.

Step 27

A bar code information reading operation by the photosensing unit 21a is performed while the detection circuit 22 operates.

Step 28

It is determined whether an optical signal input from the photosensing unit 21a coincides with a preset definition, i.e., the presence of start bars and end bars, a message length and the like. If the result is affirmative, the process proceeds to step 29, and if the result is negative, the process returns to step 26.

In consideration of the life of the built-in battery, it is arranged so that the operations at steps 26 through 28 are effective for a predetermined time.

Step 29

Set data corresponding to the newly read bar code information are written in the register, Accordingly, set data, i.e., the preceding or initial data which have been written are erased.

Step 30.

If the flag B representing whether bar code information has previously been input is not "1", the flag B is set to "1".

Figure 6:
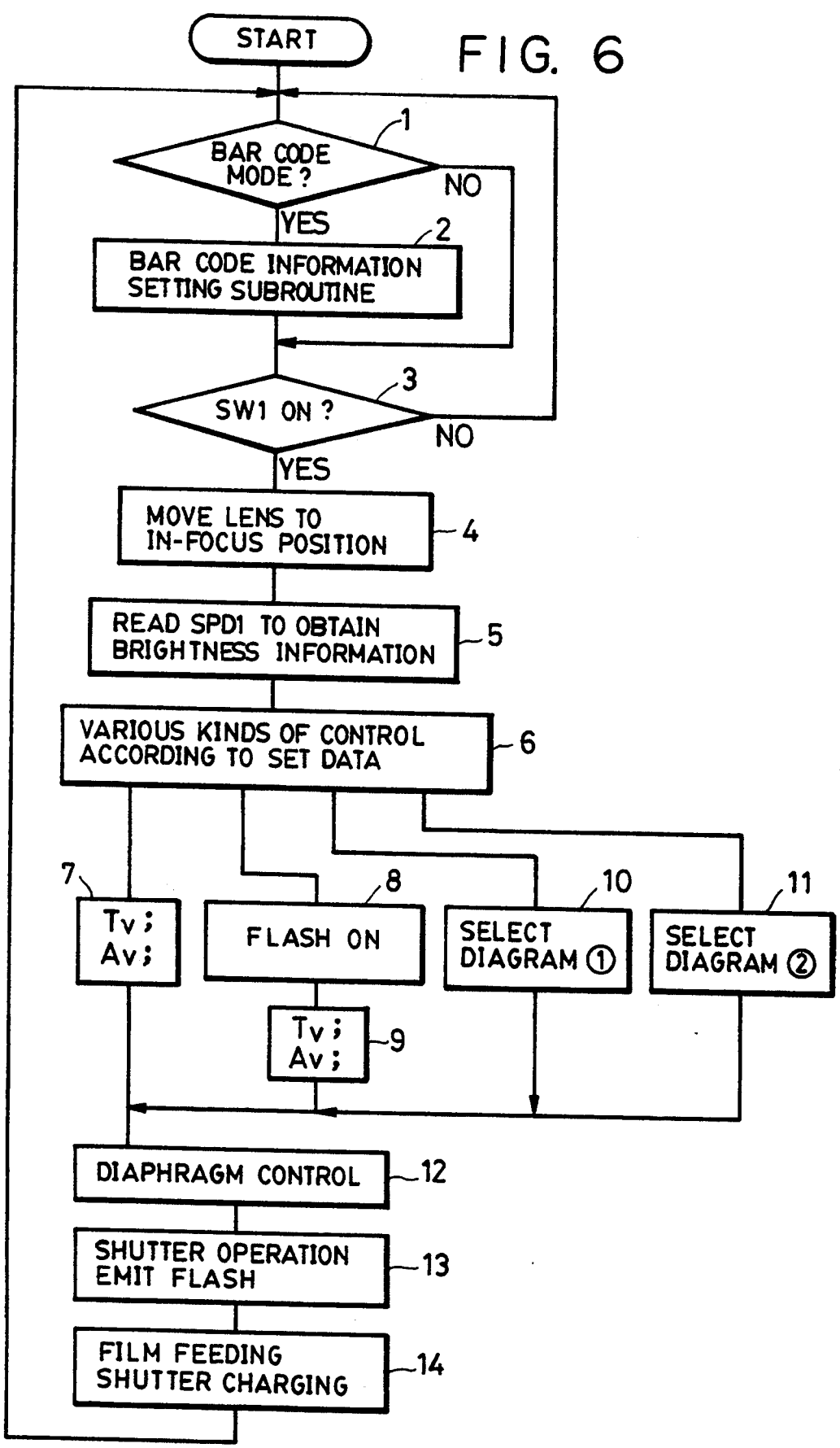
FIG. 6 is a flowchart illustrating the operation of a microcomputer used in a prefer, red embodiment of the invention for controlling camera operation.

The process then returns to the main flow, and proceeds to step 3 in FIG. 6. Even when the reading operation at step 27 has not been performed, if the shutter release button SW1 is depressed to proceed to a shutter release operation at step 3, the process returns to the main flow.

Step 3

Whether the shutter release button SW1 is depressed is determined via the input port P9. If the shutter release button SW1 is depressed, the process proceeds to step 4. If the shutter release button SW1 is not depressed, the process returns to step 1.

Step 4

Signals are output from the output ports P25, P26, P27 and P28, and the photographing optical system L1 is moved to an in-focus position after moving it back and forth. Data for performing an in-focus display are output from the output port P13 to the display driving circuit DD2 via the bus line BUS4.

Step 5

Brightness information input from the silicon photodiode SPD1 is provided to the input port P10 via the bus line BUS1 is read, and a photometric calculation is performed.

Step 6

An actual operation program is executed according to the set data written in the register at the above-described step 29 or the set, data written in the register at the above-described step 24.

Steps 7-11

Steps 7 through 11 represent four kinds of exposure control which can be executed, i.e., selected, according to bar code information.

Step 7 represents a first exposure control flow wherein a shutter time Tv and a diaphragm value Av are set irrespective of a photometric value.

Steps 8 and 9 represent a second exposure control flow for night photographing. At step 8, the built-in flash 53 (ST) is automatically popped up, and a main capacitor is charged according to an output from the output port P32 via bus line BUSS. At step 9, the shutter time Tv is set to a time period tuned to the strobe, and exposure control using a preset diaphragm value Av (the diaphragm value is determined assuming that the distance to the main object to be photographed is a preset distance corresponding to the photograph 19 shown in FIG. 2) is performed.

Step 10 represents a third exposure control flow which is suitable for a sport photographing operation shown in FIG. 4(A). The shutter time is set to a high speed (for example, 1/500 second), and the diaphragm value is obtained from the brightness information. Autofocusing is set to a servo mode for continuing an autofocusing operation even after an in-focus state. Respective ports are controlled so that film winding is performed in a continuous photographing mode.

Step 11 represents a fourth exposure control flow which is suitable for a normal photographing operation shown in FIG. 4(B). The diaphragm value and shutter time are obtained from brightness information. Autofocusing is set to a one-shot mode for prohibiting the subsequent autofocusing operation after a first in-focus state. Respective ports are controlled so that film winding is performed in a single photographing mode.

Step 12

The diaphragm is stopped to a diaphragm value obtained according to any one of the above-described steps 7 through 11.

Step 13

In order to provide a shutter time obtained according to any one of the above-described steps 7 through 11, a high-level signal is first output from the output port P30 to switch on the NPN transistor T9 and thereby supply current to the magnet Mg31. The first screen of the shutter thereby runs. After a predetermined shutter time, a high-level signal is output from the output port P31 to switch on the NPN transistor T10 and thereby supply current to the magnet Mg32. The second screen of the shutter thereby runs.

When the steps 8 and 9 have been selected, the built-in flash 53 (ST) is lit when the running of the first screen of the shutter has ended.

Step 14

The transistors T1 and T4 are switched on by signals from the output ports P21, P22, P23 and P24 to rotate the motor M1, and to thereby perform film winding and shutter charging operations.

In the above-described embodiment, a state wherein a signal transmitted from the external information reading/output device can be detected is prohibited not only using switching means, but also according to other conditions (for example, during a shutter release operation, or during a film feeding operation), the life of the battery can be prolonged. Furthermore, the setting of erroneous exposure conditions due to an erroneous operation can be prevented.

The individual components shown in outline or designated by blocks in the drawings are all well-known in the arts relating to optical apparatus responsive to an external signal and their specification construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
   (a) detection means for detecting a selecting signal transmitted from an external information output device;
   (b) switching means for switching said detection means to a detectable state;
   (c) limitation means for making said detection means nonoperable, in response to the beginning of at least one of a photographing operation, a film feeding operation, and a mode changing operation, irrespective of any state of said switching means; and
   (d) control means for controlling the operation of the camera according to information detected by said detection means.

2. A camera according to claim 1, wherein said photographing operation comprises at least one of a shutter release operation, a diaphragm operation, and a mirror operation.

3. A camera according to claim 1, wherein said limitation means makes said detection means nonoperable during a film feeding operation irrespective of any state of said switching means.

4. A camera according to claim 1, wherein said detection means detects an optical signal from said information output device.

5. A camera according to claim 1, wherein said switching means includes a switch which is switched by said information output device being pressed thereon.

6. A camera according to claim 1, wherein said limitation means makes said detection means nonoperable by making said detection means in a nondetectable state.

7. A camera according to claim 1, wherein said control means controls an exposure operation.

8. A camera according to claim 1, wherein said information output device outputs a digital data signal to said camera.

9. A camera according to claim 8, wherein said information output device comprises means for reading bar code information and generating the digital data signal in response to the read information.

10. A camera according to claim 9, wherein said limitation means makes said detection means nonoperable during a shutter release operation irrespective of any state of said switching means.

11. A camera according to claim 9, wherein said limitation means makes said detection means nonoperable during a film feeding operation irrespective of any state of said switching means.

12. A camera according the claim 9, wherein said detection means detects an optical signal from said information output device.

13. A camera according to claim 9, wherein said switching means includes a switch which is switched by said information output device being pressed thereon.

14. A camera according to claim 9, wherein said limitation means makes said detection means nonoperable by making said detection means in a nondetectable state.

15. A camera according to claim 9, wherein said control means controls an exposure operation.

16. A camera comprising:
 (a) detection means for detecting a selecting signal transmitted from an external information output device;
 (b) switching means for switching said detection means to a detectable state;
 (c) limitation means for making said detection means nonoperable, in response to the beginning of at least one of a photographing operation, a film feeding operation, and a mode changing operation, irrespective of any state of said switching means; and
 (d) control means for controlling an exposure operation according to information detected by said detection means.

17. An optical apparatus according to claim 16, wherein said limitation means makes said detection means nonoperable during the photographing operation irrespective of any state of said switching means, wherein the photographing operation comprises at least one of a shutter operation, a diaphragm operation and a mirror operation.

18. An optical apparatus according to claim 16, wherein said detection means detects an optical signal from said information output device.

19. An optical apparatus according to claim 16, wherein said switching means includes a switch which is switched by said information output device being pressed thereon.

20. An optical apparatus according to claim 16, wherein said limitation means makes said detection means nonoperable by making said detection means in a nondetectable state.

21. An optical apparatus according to claim 16, wherein said information output device outputs a digital data signal to said optical apparatus.

22. An optical apparatus according to claim 21, wherein said information output device comprises means for reading bar code information and generating the digital data signal in response to the read information.

23. An optical apparatus comprising:
 (a) detection means for detecting a selecting signal transmitted from an external information output device;
 (b) switching means for switching said detection means to a detectable state in accordance with a predetermined contacting state of said external information output device;
 (c) limitation means for making said detection means nonoperable, in response to the beginning of at least one of a photographing operation, a film feeding operation, and a mode changing operation, irrespective of any state of said switching means; and
 (d) control means for controlling the operation of the optical apparatus according to information detected by said detection means.

24. An optical apparatus according to claim 23, wherein said photographing operation comprises at least one of a shutter release operation, a diaphragm operation, and a mirror operation.

25. An optical apparatus according to claim 23, wherein said limitation means makes said detection means nonoperable during a film feeding operation irrespective of any state of said switching means.

26. An optical apparatus according to claim 23, wherein said detection means detects an optical signal from said information output device.

27. An optical apparatus according to claim 23, wherein said switching means includes a switch which is switched by said information output device being pressed thereon.

28. An optical apparatus according to claim 23, wherein said control means controls an exposure operation.

29. An optical apparatus according to claim 23, wherein said information output device comprises means for reading bar code information and generating a digital data signal in response to the read information.

30. A camera comprising:
 (a) detection means for detecting a signal related to photographing transmitted from an external information output device;
 (b) switching means for switching said detection means to an operable state;
 (c) limitation means for making said detection means inoperable, in response to state of at least one of a photographing operation, a film feeding operation, and a mode changing operation, irrespective of any state of said switching means; and
 (d) control means for controlling the operation of the camera according to information detected by said detection means.

31. A camera according to claim 30, wherein said photographing operation comprises at least one of a shutter release operation, a diagram operation, and a mirror operation.

32. A camera according to claim 30, wherein said detection means detects an optical signal from the information output device.

33. A camera according to claim 30, wherein said switching means comprises a switch which is switched by pressing thereon said information output device.

34. A camera according to claim 30, wherein said control means controls an exposure operation.

35. A camera according to claim 30, wherein said information output device comprises means for reading bar code information and generating a digital data signal in response to the read information.

* * * * *

UNITED STATES PATENT AND TRADEMARK OFFICE
CERTIFICATE OF CORRECTION

PATENT NO. : 5,381,207
DATED : January 10, 1995
INVENTOR(S) : Jirou Kazumi

It is certified that error appears in the above-indentified patent and that said Letters Patent is hereby corrected as shown below:

COLUMN 1:

Line 37, "cons;rant" should read --constant--.

COLUMN 2:

Line 20, "prefer,red" should read --preferred--.

COLUMN 3:

Line 15, "SPI)5." should read --SPD 5.--.

COLUMN 6:

Line 15, "axed" should read --and--.
    Line 20, "17," shoulld read --17.--.
    Line 61, "hexadecimal" should read --binary--.

UNITED STATES PATENT AND TRADEMARK OFFICE
CERTIFICATE OF CORRECTION

PATENT NO. : 5,381,207
DATED : January 10, 1995
INVENTOR(S) : Jirou Kazumi

It is certified that error appears in the above-indentified patent and that said Letters Patent is hereby corrected as shown below:

COLUMN 9:

Line 25, "BUSS." should read --BUS 5.--.

COLUMN 12:

Line 45, "to state" should read --to a state--.
Line 54, "diagram" should read --diaphragm--.

Signed and Sealed this

Sixth Day of June, 1995

Attest:

BRUCE LEHMAN

*Attesting Officer*　　*Commissioner of Patents and Trademarks*